(12) United States Patent
Iwano et al.

(10) Patent No.: US 11,565,364 B2
(45) Date of Patent: Jan. 31, 2023

(54) POLISHING DEVICE FOR WELDING TIP

(71) Applicant: TOYOTA JIDOSHA KABUSHIKI KAISHA, Toyota (JP)

(72) Inventors: Yoshihiro Iwano, Toyota (JP); Ryo Kanakubo, Toyota (JP); Shougo Sanda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 785 days.

(21) Appl. No.: 16/550,359

(22) Filed: Aug. 26, 2019

(65) Prior Publication Data

US 2020/0094366 A1    Mar. 26, 2020

(30) Foreign Application Priority Data

Sep. 21, 2018 (JP) .............................. JP2018-176920

(51) Int. Cl.
*B24B 19/16* (2006.01)
*B23K 11/30* (2006.01)

(52) U.S. Cl.
CPC .......... *B24B 19/16* (2013.01); *B23K 11/3063* (2013.01)

(58) Field of Classification Search
CPC ............................ B24B 19/16; B23K 11/3063
USPC ....................................................... 451/294
See application file for complete search history.

(56) References Cited

U.S. PATENT DOCUMENTS

2007/0127998 A1* 6/2007 Shim .................. B23K 11/3063
409/139

FOREIGN PATENT DOCUMENTS

JP            7-144285 A        6/1995

* cited by examiner

*Primary Examiner* — Dana Ross
*Assistant Examiner* — Joe E Mills, Jr.
(74) *Attorney, Agent, or Firm* — Oblon, McClelland, Maier & Neustadt, L.L.P.

(57) ABSTRACT

A polishing device for a welding tip includes a cylindrical holder; and a polishing unit. The polishing unit includes a blade configured to polish a welding tip. The blade polishes the welding tip due to rotation of the polishing unit. The holder includes a groove extending along an entire inner circumference of the holder. The groove includes axial groove portions each of which extends along an axis of the holder, and inclined groove portions each of which extends for a specified first distance and is inclined in one direction with respect to the axial groove portions. The axial groove portions and the inclined groove portions are alternately arranged. The polishing unit includes projected portions each of which extends to an inside of the groove, and the number of the projected portions is two or more and is equal to or less than the number of the axial groove portions.

3 Claims, 15 Drawing Sheets

POLISHING DEVICE FOR WELDING TIP

INCORPORATION BY REFERENCE

The disclosure of Japanese Patent Application No. 2018-176920 filed on Sep. 21, 2018 including the specification, drawings and abstract is incorporated herein by reference in its entirety.

BACKGROUND

1. Technical Field

The disclosure relates to a polishing device for a welding tip.

2. Description of Related Art

There is a polishing device for a welding tip that polishes a welding tip by rotating one of the welding tip and a blade while the welding tip and the blade are in contact each other. An example of such a polishing device is disclosed in Japanese Patent Application Publication No. 7-144285 (JP 7-144285 A).

SUMMARY

The inventors of the present application have found the following problems on such a polishing device for a welding tip. The polishing devices for a welding tip often require an actuator used to rotate the welding tip or the blade, in addition to an actuator used for causing the translational motion of the welding tip. Thus, there is room for cost reduction.

Meanwhile, a method of polishing the welding tip by rotating the welding tip or the blade with the use of a worker's hands is conceivable. However, such a method requires the worker's operation and requires significant man-hours. Thus, also in such a case, there is room for simplification.

The disclosure provides a polishing device for a welding tip, which makes it possible to simplify polishing work on the welding tip and to reduce cost with a simple configuration.

An aspect of the disclosure relates to a polishing device for a welding tip. The polishing device includes a holder having a cylindrical shape; and a polishing unit that is held in an inside of the holder so as to be rotatable about an axis of the holder. The polishing unit includes a blade configured to polish a welding tip. The blade polishes the welding tip due to rotation of the polishing unit. The holder includes a groove that extends along an entire inner circumference of the holder. The groove includes axial groove portions each of which extends along the axis of the holder, and inclined groove portions each of which extends for a specified first distance and is inclined in one direction with respect to the axial groove portions. The axial groove portions and the inclined groove portions are alternately arranged. The polishing unit includes projected portions each of which extends to an inside of the groove, and the number of the projected portions is two or more and is equal to or less than the number of the axial groove portions.

With the configuration, when the welding tip is translated and pressed against the blade, the projected portions of the polishing unit move along the groove, and the polishing unit rotates. Along with rotation of the polishing unit, the blade rotates while the blade is in contact with the welding tip. Thus, the blade polishes the welding tip. Accordingly, the welding tip can be polished without a need of an actuator that rotates the welding tip or the blade. Thus, cost can be reduced. In addition, a process of directly rotating the welding tip or the blade with the use of a worker's hands is not required. Thus, an increase in man-hours can be restrained, and the welding tip can be continuously polished. As a result, it is possible to simplify the polishing work on the welding tip. Accordingly, it is possible to simplify the polishing work on the welding tip and to reduce cost with a simple configuration.

The polishing unit may include a file; a specified second distance may be provided between a center of the file and a center axis of the polishing unit; and when the welding tip contacts the polishing unit, the blade and the file may contact a distal end of the welding tip.

With the configuration, the file is provided at a position at the specified second distance from the center axis of the polishing unit. When the welding tip contacts the polishing unit, the file contacts the distal end of the welding tip. Accordingly, when the file rotates due to the rotation of the polishing unit, the welding tip can be reliably finished with good accuracy. One of the reasons is that a portion of the file, which contacts the welding tip, moves greatly.

When the welding tip contacts the polishing unit, the welding tip may be held between the blade and the file.

With the configuration, the welding tip is held between the blade and the file. Thus, the welding tip can be stably finished.

According to the disclosure, the polishing work on the welding tip can be simplified with the simple configuration, and thus the cost therefor can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a detailed description will be provided on an embodiment of the disclosure, with reference to the drawings. It should be noted that the disclosure is not limited to the following embodiment. In addition, for a purpose of clarifying the description, the following description and the drawings will be appropriately simplified.

Figure 1:
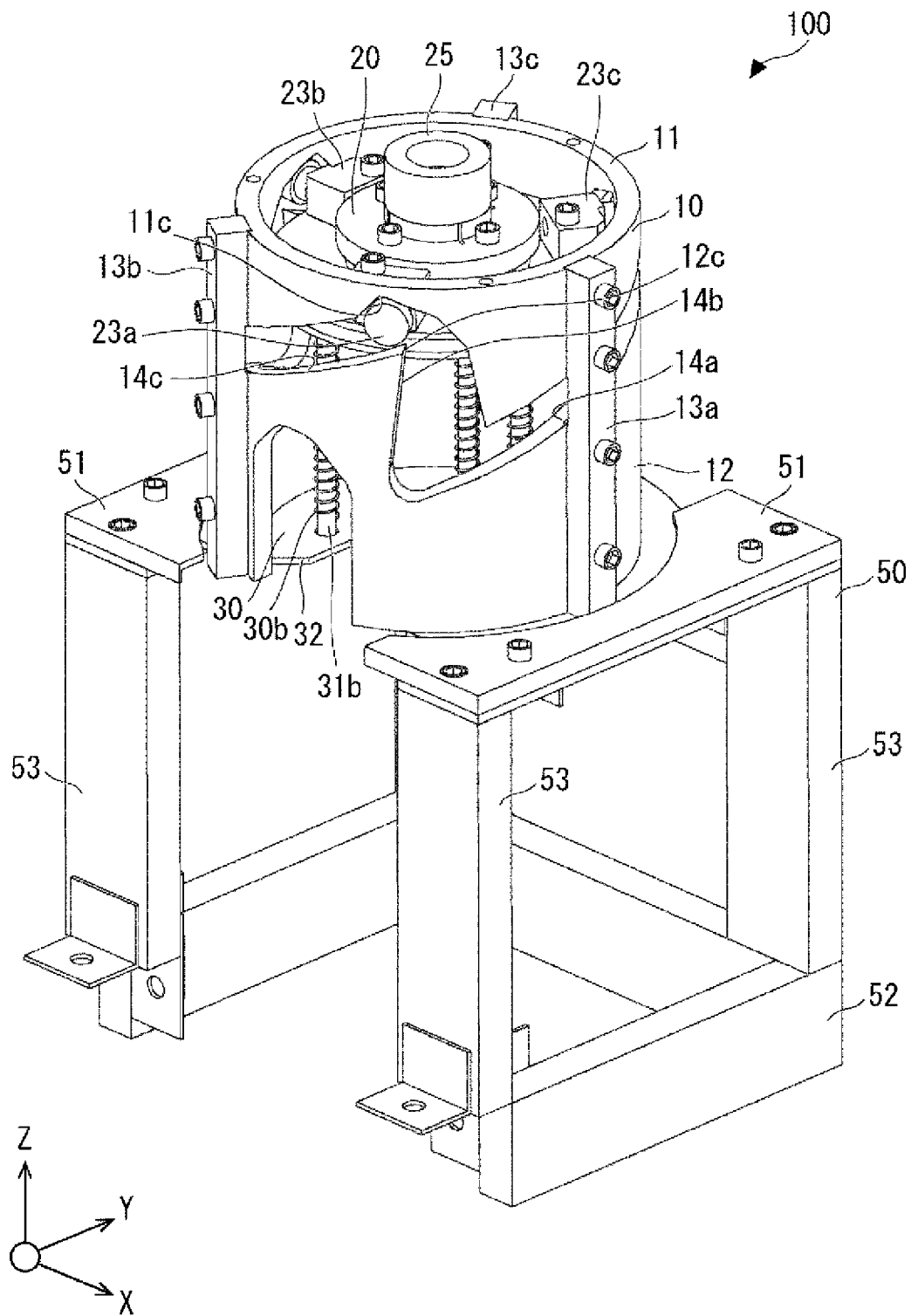
FIG. 1 is a perspective view of a polishing device according to a first embodiment.
Figure 2:
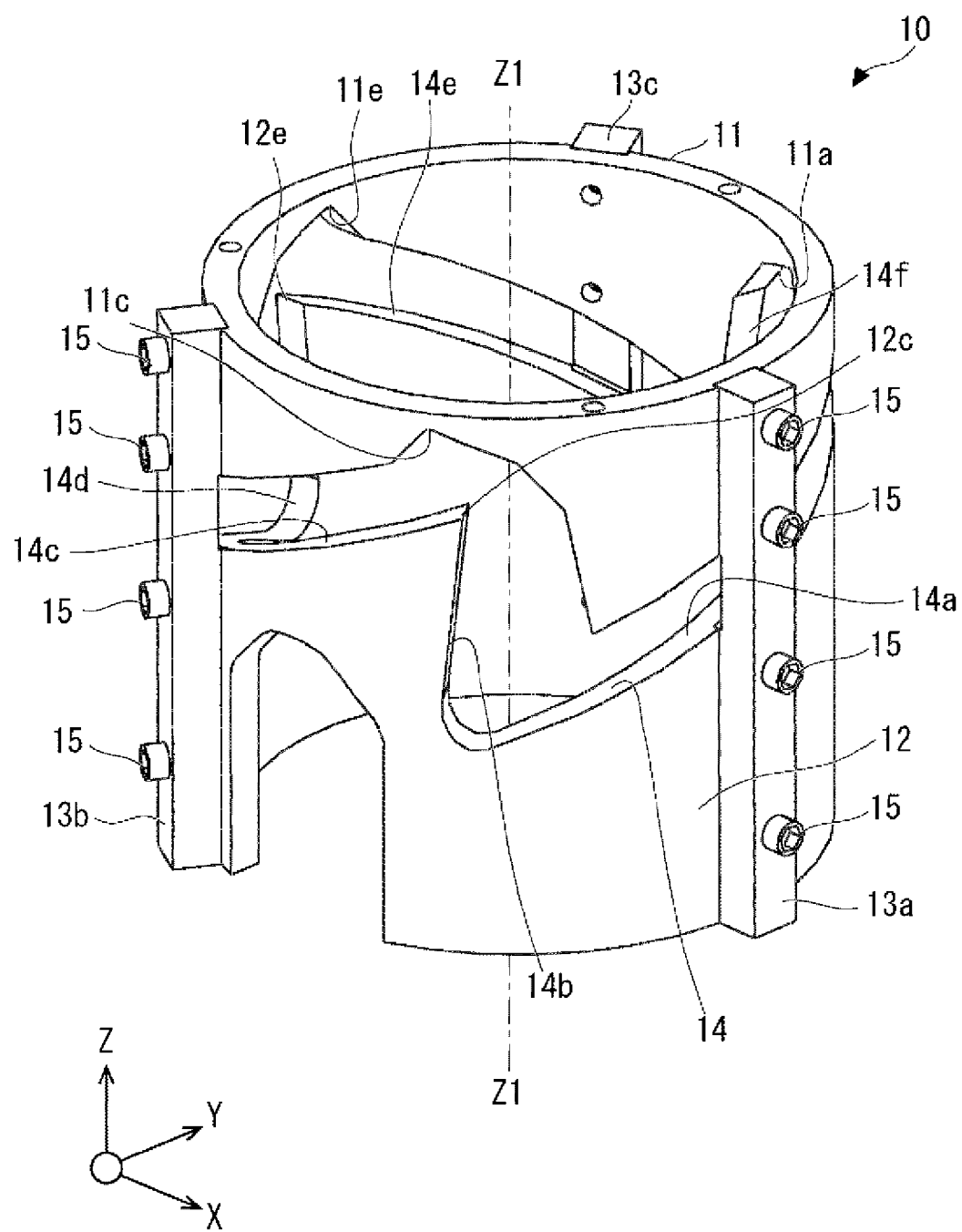
FIG. 2 is a perspective view of a holder of the polishing device according to the first embodiment.
Figure 3:
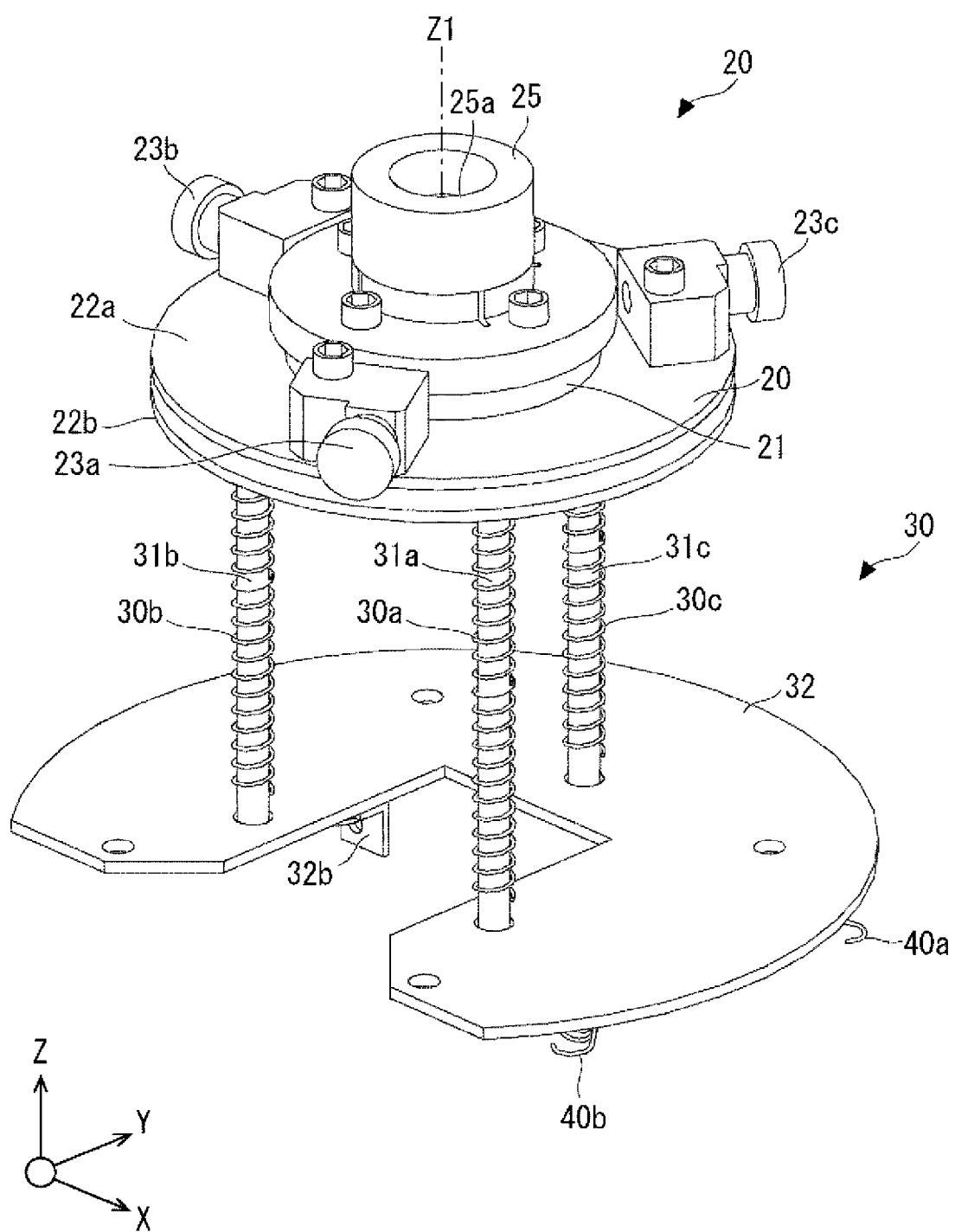
FIG. 3 is a perspective view of a polishing unit and the like in the polishing device according to the first embodiment.
Figure 4:
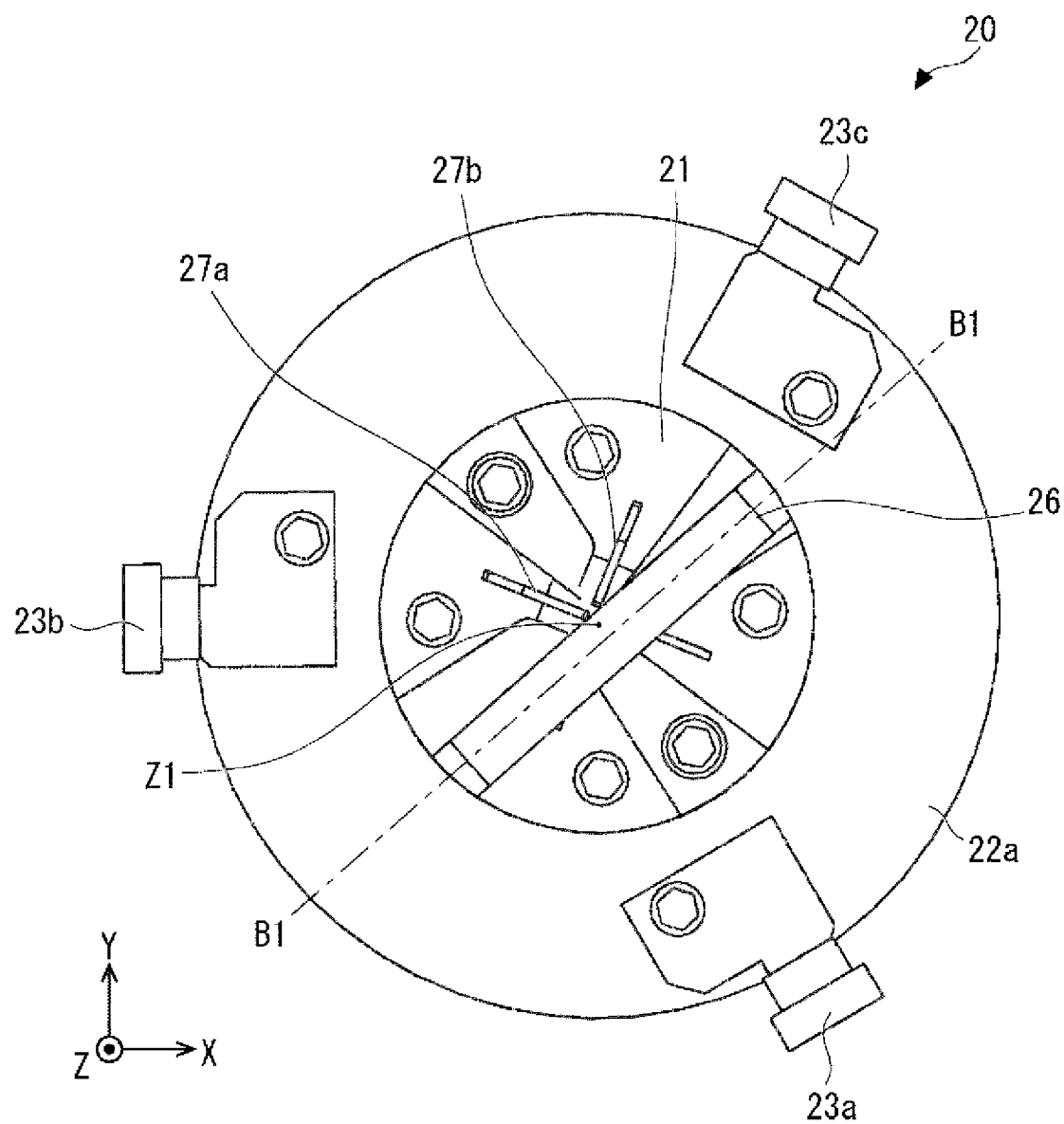
FIG. 4 is a top view of the polishing unit and the like in the polishing device according to the first embodiment.
Figure 5:
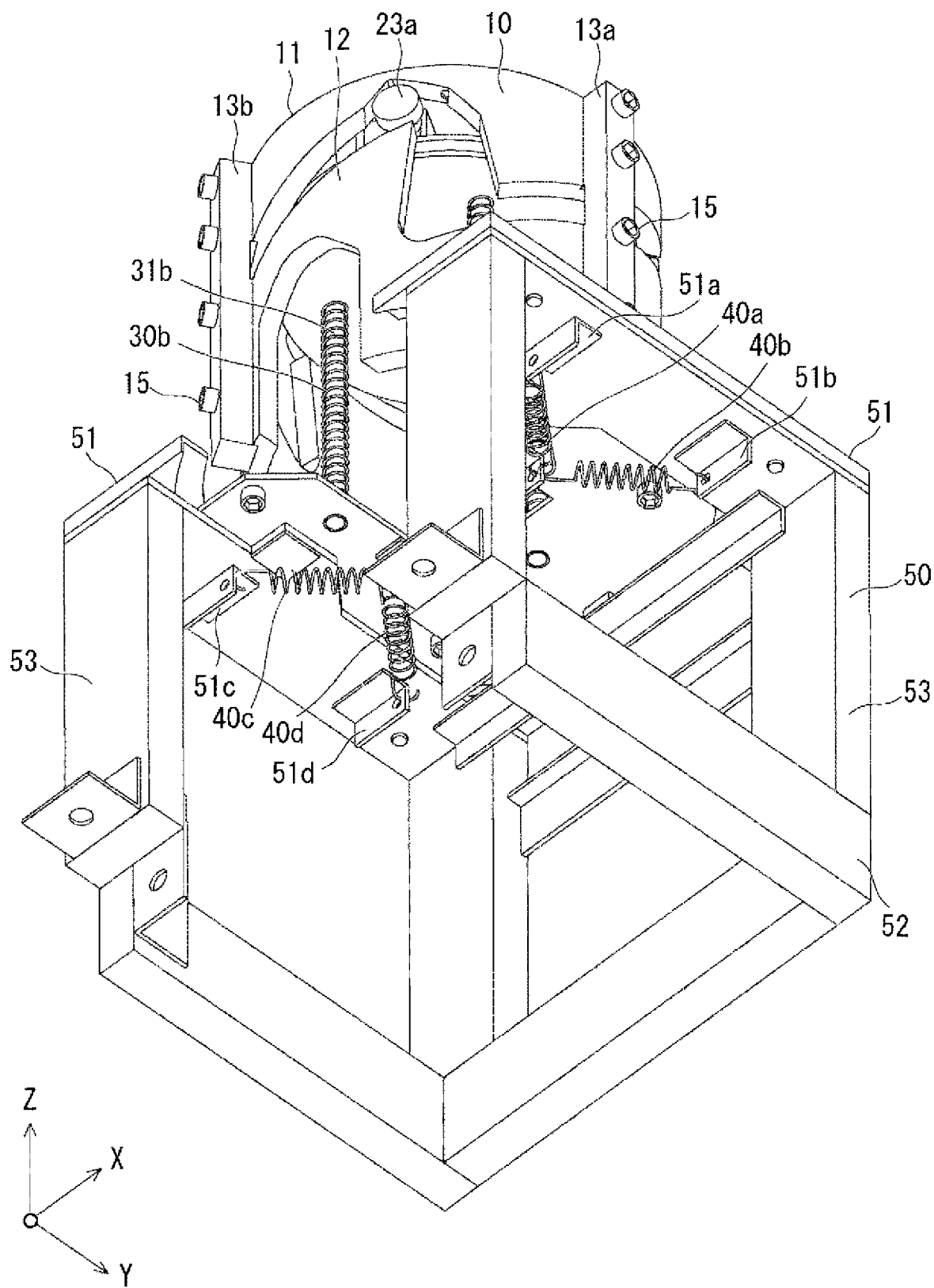
FIG. 5 is a perspective view of the polishing device according to the first embodiment that is seen from below.
Figure 6:
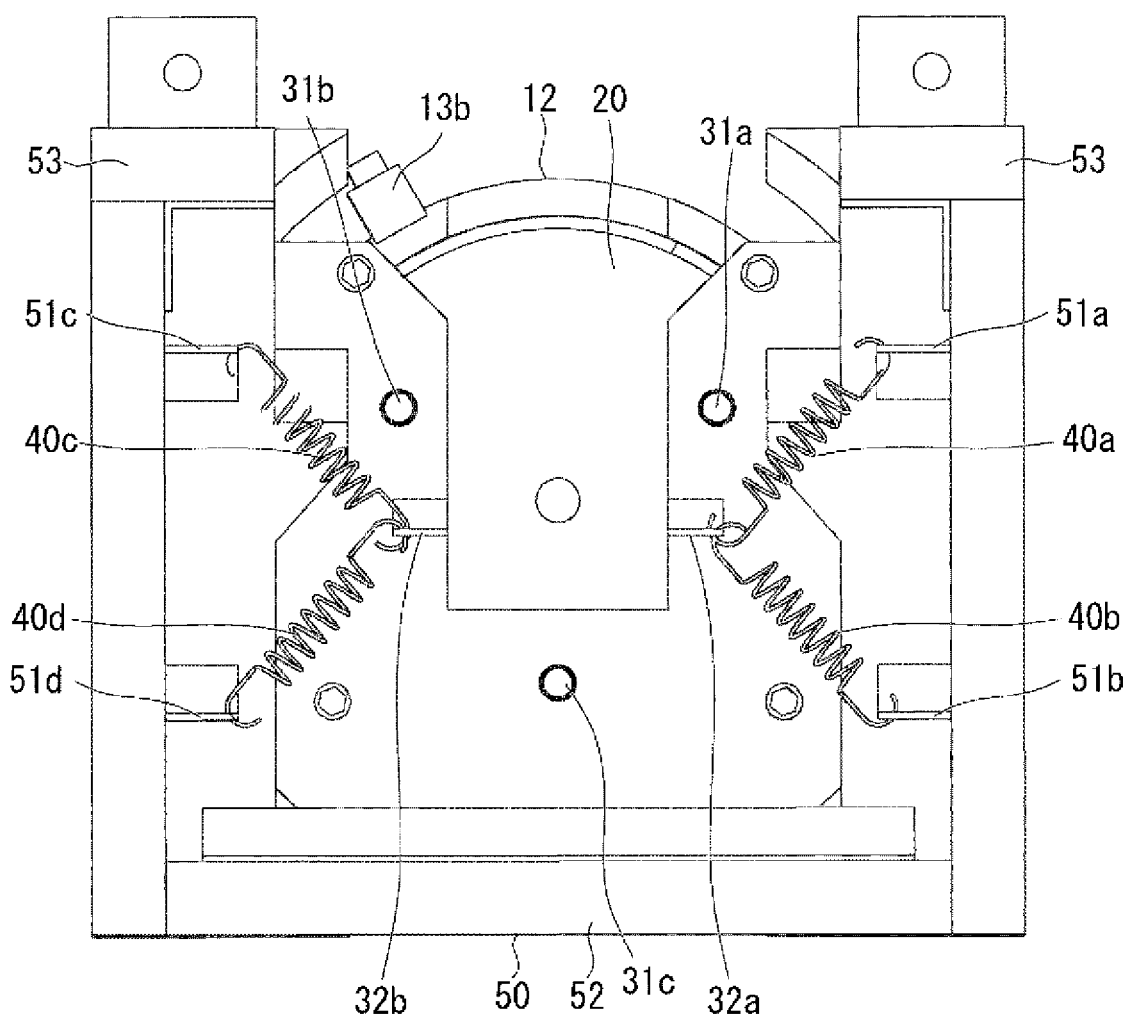
FIG. 6 is a bottom view of the polishing device according to the first embodiment.
Figure 6:
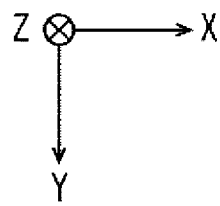

A description will be provided on a first embodiment with reference to FIG. 1 to FIG. 6. It should be noted that right-handed X, Y, Z coordinates illustrated in FIG. 1 and other drawings are provided to illustrate positional relationships among components. In general, a direction toward a positive side on a Z-axis is a vertically upward direction, an X-Y plane is a horizontal plane, and these are common in the drawings. FIG. 1 is a perspective view of a polishing device according to the first embodiment. FIG. 2 is a perspective view of a holder of the polishing device according to the first embodiment. FIG. 3 is a perspective view of a polishing unit and the like in the polishing device according to the first embodiment. FIG. 4 is a top view of the polishing unit and the like in the polishing device according to the first embodiment. FIG. 5 is a perspective view of the polishing device according to the first embodiment that is seen from below. FIG. 6 is a bottom view of the polishing device according to the first embodiment.

As illustrated in FIG. 1, a polishing device 100 includes a holder 10, a polishing unit 20, and a polishing unit pressing unit 30. Note that the polishing device 100 does not require an actuator that directly causes rotary motion of the polishing unit 20.

As illustrated in FIG. 2, the holder 10 is a cylindrical body having a center axis Z1, and a groove 14 extends along an entire inner circumference of the cylindrical body.

One specific example of the holder 10, which is illustrated in FIG. 2, includes an upper cylindrical portion 11 and a lower cylindrical portion 12. The lower cylindrical portion 12 is connected to the upper cylindrical portion 11 via connecting portions 13a, 13b, 13c, each of which extends in an axial direction of the holder 10. The lower cylindrical portion 12 is disposed below the upper cylindrical portion 11 at a specified distance from the upper cylindrical portion 11.

Each of the connecting portions 13a, 13b, 13c is fastened to the upper cylindrical portion 11 and the lower cylindrical portion 12 by a plurality of bolts 15.

The groove 14 is provided between the upper cylindrical portion 11 and the lower cylindrical portion 12. The groove 14 includes inclined groove portions 14a, 14c, 14e and axial groove portions 14b, 14d, 14f. Each of the inclined groove portions 14a, 14c, 14e extends for a specified first distance in one of directions inclined with respect to the axis of the holder 10. Each of the axial groove portions 14b, 14d, 14f extends in a direction along the center axis Z1 of the holder 10. On an inner peripheral surface of the holder 10, the inclined groove portion 14a, the axial groove portion 14b, the inclined groove portion 14c, the axial groove portion 14d, the inclined groove portion 14e, and the axial groove portion 14f are arranged in the stated order in a clockwise direction, and are continuous with each other when seen from a top of the holder 10. That is, the inclined groove portions and the axial groove portions are alternately arranged. The inclined groove portion 14a connects an upper end of the axial groove portion 14f and a lower end of the axial groove portion 14b. The inclined groove portion 14c connects an upper end of the axial groove portion 14b and a lower end of the axial groove portion 14d. The inclined groove portion 14e connects an upper end of the axial groove portion 14d and a lower end of the axial groove portion 14f. While the specific example of the holder 10 illustrated in FIG. 1 and FIG. 2 includes the three inclined groove portions and the three axial groove portions, the number of the inclined groove portions and the number of the axial groove portions are not limited, as long as the holder 10 includes the plurality of groove portions and the plurality of axial groove portions.

Here, a crossing portion 12a (see FIG. 8) and a highest point 11a are provided. At the crossing portion 12a, the inclined groove portion 14a and the axial groove portion 14f cross each other on the lower cylindrical portion 12 side. In a portion where the inclined groove portion 14a and the axial groove portion 14f cross each other on the upper cylindrical portion 11 side, the highest point 11a is located at the highest position. The highest point 11a may be located closer to the inclined groove portion 14a than the crossing portion 12a is. In addition, a crossing portion 12c and a highest point 11c are provided. At the crossing portion 12c, the inclined groove portion 14c and the axial groove portion 14b cross each other on the lower cylindrical portion 12 side. The highest point 11c is located at the highest position in a portion in which the inclined groove portion 14c and the axial groove portion 14b cross each other on the upper cylindrical portion 11 side. The highest point 11c may be located closer to the inclined groove portion 14c than the crossing portion 12c is. Furthermore, a crossing portion 12e and a highest point 11e are provided. At the crossing portion 12e, the inclined groove portion 14e and the axial groove portion 14d cross each other on the lower cylindrical portion 12 side. The highest point 11e is located at the highest position in a portion in which the inclined groove portion 14e and the axial groove portion 14d cross each other on the upper cylindrical portion 11 side. The highest point 11e may be located closer to the inclined groove portion 14e than the crossing portion 12e is.

As illustrated in FIG. 3, in the inside of the holder 10, the polishing unit 20 is held so as to be rotatable about the center axis Z1 of the holder 10. The polishing unit 20 includes a body 21, plates 22a, 22b, projected portions 23a, 23b, 23c, and a welding tip guide 25.

In the inside of the holder 10, each of the plates 22a, 22b includes a disc-shaped body in such size that the body can rotate about the center axis Z1. Although the plates 22a, 22b are stacked, the plates 22a, 22b can rotate in different directions from each other about the center axis Z1. A ring-shaped body, which has a smaller diameter than diameters of the plates 22a, 22b, may be held between the plate 22a and the plate 22b. The plate 22a supports the body 21 and the projected portions 23a, 23b, 23c. The center axis Z1 may be a center axis of at least one of the plates 22a, 22b and the polishing unit 20.

The body 21 is a plate having the same area as or a smaller area than that of each of the plates 22a, 22b. One example of the body 21, which is illustrated in FIG. 3, is a disc-shaped body whose diameter is smaller than the diameters of the plates 22a, 22b. The body 21 may be disposed on or in the vicinity of the center axis Z1. A center axis of the body 21 may be located at the same position as the center axis Z1 of the plate 22a.

Each of the projected portions 23a, 23b, 23c is projected in a radial direction of the plates 22a, 22b, in other words, projected in a direction away from the center axis Z1 and enters the groove 14. The projected portions 23a, 23b, 23c may be arranged at equally-spaced intervals on an outer edge of the plate 22a. One specific example of the polishing unit 20, which is illustrated in FIG. 3, includes the projected portions 23a, 23b, 23c, that is, three projected portions. However, the polishing unit 20 may include two or more projected portions. In addition, the specific example of the polishing unit 20, which is illustrated in FIG. 3, includes the axial groove portions 14b, 14d, 14f, that is, three axial groove portions, and includes the same number of, that is, three projected portions. However, the polishing unit 20 may include the projected portions such that the number of the projected portions is equal to or smaller than the number of the axial groove portions.

The welding tip guide 25 is disposed on an upper surface of the body 21. Almost all of the upper surface of the body 21 is covered with the welding tip guide 25. The welding tip guide 25 includes a through-hole 25a through which a welding tip is guided to the body 21.

As illustrated in FIG. 4, the body 21 includes a file 26 and chamfering blades 27a, 27b. One specific example of the body 21, which is illustrated in FIG. 4, includes two chamfering blades. However, the body 21 may include one chamfering blade or three or more chamfering blades. The number N2 (units) of the chamfering blades may vary in accordance with the number N1 of the axial groove portions such as the axial groove portions 14b, 14d, 14f. For example, it is preferred that the number N2 (units) of the chamfering blades should be equal to or smaller than the number N1 (units) of the axial groove portions because a friction force between the chamfering blade(s) and the welding tip is reduced to an appropriate magnitude.

The file 26 is a belt-shaped body and crosses the center axis Z1. A center axis B1 in the file 26, which extends longitudinally, is located on the X-Y plane. When the polishing unit 20 rotates about the center axis Z1, the file 26 rotates, and the center axis B1 also rotates. A specified distance may be provided between a center of the file 26 and the center axis Z1 of the polishing unit 20. In one specific example illustrated in FIG. 4, the center axis B1 may extend on one side of the center axis Z1. That is, the center axis B1 of the belt-shaped body does not cross the center axis Z1, and the specified distance is provided between the center axis B1 and the center axis Z1.

The chamfering blades 27a, 27b may be provided in the vicinity of the center axis Z1. In addition, when seen from above (here, the positive side on the Z-axis), the chamfering blades 27a, 27b and the center axis B1 of the file 26 may be located such that the center axis Z1 is located between the positions of the chamfering blades 27a, 27b and the position of the center axis B1 of the file 26.

As illustrated in FIG. 3, the polishing unit pressing unit 30 includes springs 30a, 30b, 30c, shaft bodies 31a, 31b, 31c, and a plate 32.

The springs 30a, 30b, 30c are respectively provided around the shaft bodies 31a, 31b, 31c and are held between the plate 22b and the plate 32. In the case where none of the springs 30a, 30b, 30c receives a load from the plate 22b and the plate 32, a length of each of the springs 30a, 30b, 30c is greater than a distance between the plate 22b and the plate 32. That is, because the springs 30a, 30b, 30c are compressed by the plate 22b and the plate 32, the springs 30a, 30b, 30c repel to press the polishing unit 20 toward the welding tip guide 25 (in the example illustrated in FIG. 1, the positive side on the Z-axis).

Minimum values of elastic moduli of the springs 30a, 30b, 30c may have such magnitudes that the projected portions 23a, 23b, 23c in the polishing unit 20 reach the upper ends of the axial groove portions 14b, 14d, 14f (see FIG. 1 and FIG. 2) as a result of the polishing unit 20 receiving restoring forces of the springs 30a, 30b, 30c. In addition, maximum values of the elastic moduli of the springs 30a, 30b, 30c may be reduced to have such magnitudes that the projected portions 23a, 23b, 23c reach the lower ends of the axial groove portions 14b, 14d, 14f as a result of the welding tip pressing the polishing unit 20. That is, the maximum value of the elastic modulus of each of the springs 30a, 30b, 30c may be determined in accordance with technical means that causes the welding tip to press the polishing unit 20. Examples of such technical means include an arm of a welding robot and a worker's hands.

One ends of the shaft bodies 31a, 31b, 31c are provided on a bottom surface of the plate 22b in the polishing unit 20. The shaft bodies 31a, 31b, 31c extend downward (here, toward a negative side on the Z-axis) from the bottom surface of the plate 22b. The shaft bodies 31a, 31b, 31c may be located at positions at specified intervals around the center axis Z1 of the body 21 serving as a center. The other ends of the shaft bodies 31a, 31b, 31c are inserted through the plate 32.

One specific example of the polishing device 100, which is illustrated in FIG. 1, further includes a base 50. The base 50 includes a top plate 51, a lower frame 52, and legs 53. The lower frame 52 is a frame body in a right-angle U shape, a U-shape, or a C-shape, for example. The legs 53 extend upward from portions of the lower frame 52, such as both ends and a bent portion, to support the top plate 51. The top plate 51 supports the holder 10 and the polishing unit 20.

As illustrated in FIG. 5 and FIG. 6, the plate 32 is mechanically connected to the base 50 via at least two springs (for example, spring 40a and the like). In one specific example illustrated in FIG. 5 and FIG. 6, the spring 40a is connected to a connecting piece 32a on the plate 32 and a connecting piece 51a on the top plate 51 of the base 50. A spring 40b is connected to the connecting piece 32a on the plate 32 and a connecting piece 51b on the top plate 51 of the base 50. A spring 40c is connected to a connecting piece 32b on the plate 32 and a connecting piece 51c on the top plate 51 of the base 50. A spring 40d is connected to the connecting piece 32b on the plate 32 and a connecting piece 51d on the top plate 51 of the base 50. At least two of the springs 40a, 40b, 40c, 40d pull the polishing unit 20 via the plate 32 and the like. The polishing unit 20 includes a floating mechanism that causes the polishing unit 20 to float from the base 50, and, when receiving a force in a specified magnitude in a direction along a horizontal surface (here, the virtual X-Y plane), the polishing unit 20 can move in the direction.

Here, in the case where the welding tip is inserted in the through-hole 25a of the welding tip guide 25, an outer peripheral surface of the welding tip may be protruding from the inside of the through-hole 25a to the outside thereof and thus may contact an inner peripheral surface of the through-hole 25a. Even in such a case, when the welding tip contacts the inner peripheral surface of the through-hole 25a, the spring 40a and the like are compressed or extended, and the polishing unit 20 moves in a direction of the extension or compression. Accordingly, the welding tip can be easily inserted in the through-hole 25a of the welding tip guide 25.

Figure 7:
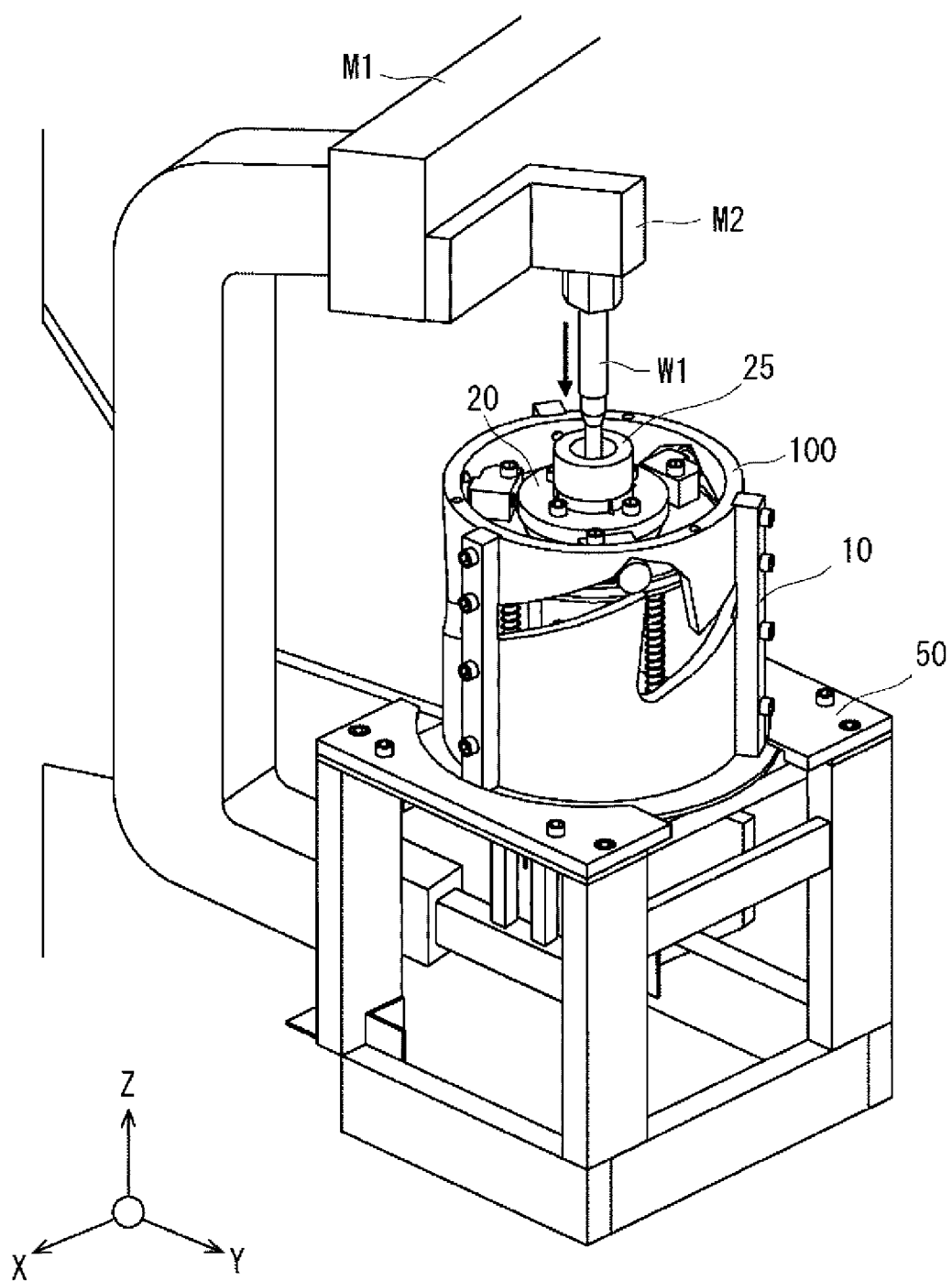
FIG. 7 is a view illustrating a method of using the polishing device according to the first embodiment.
Figure 8:
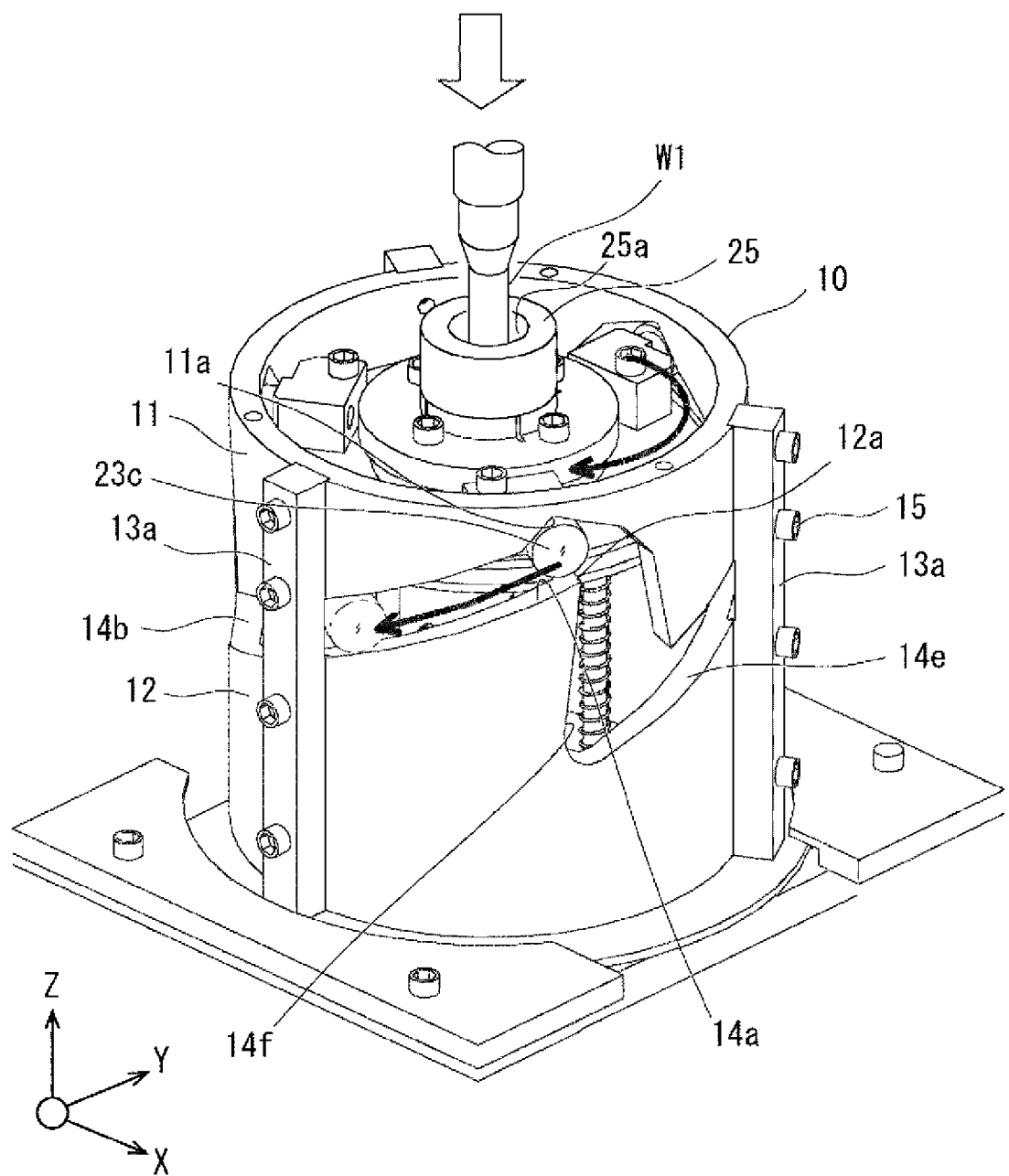
FIG. 8 is another view illustrating the method of using the polishing device according to the first embodiment.
Figure 9A:
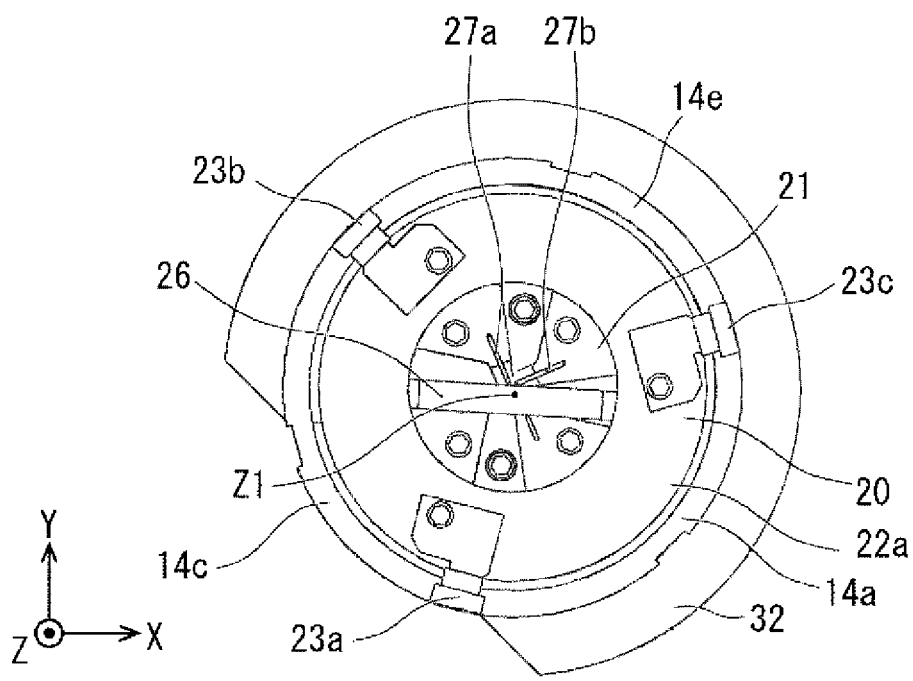
FIG. 9A is a top view illustrating rotating operation of the polishing unit in the polishing device according to the first embodiment.
Figure 9B:
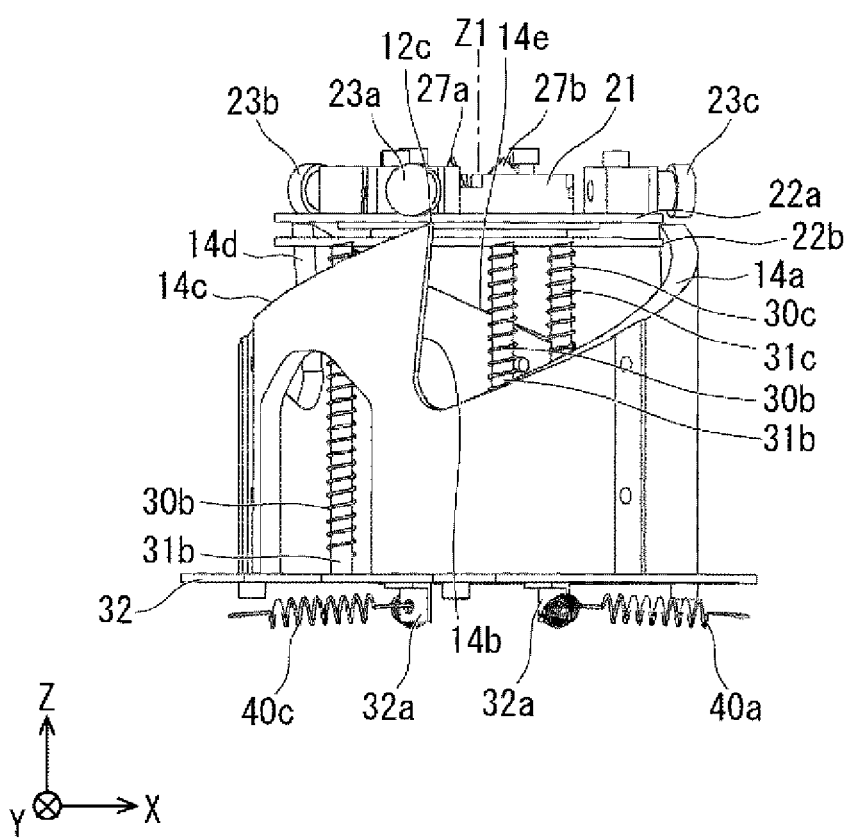
FIG. 9B is a side view illustrating the rotating operation of the polishing unit in the polishing device according to the first embodiment.
Figure 10:
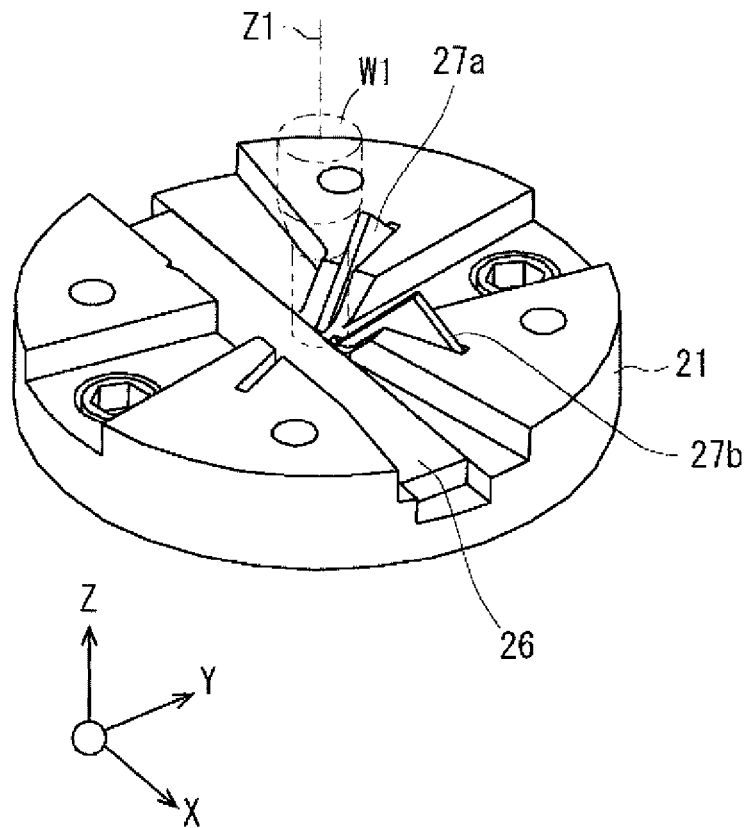
FIG. 10 is a perspective view illustrating polishing operation of the polishing unit in the polishing device according to the first embodiment.
Figure 11:
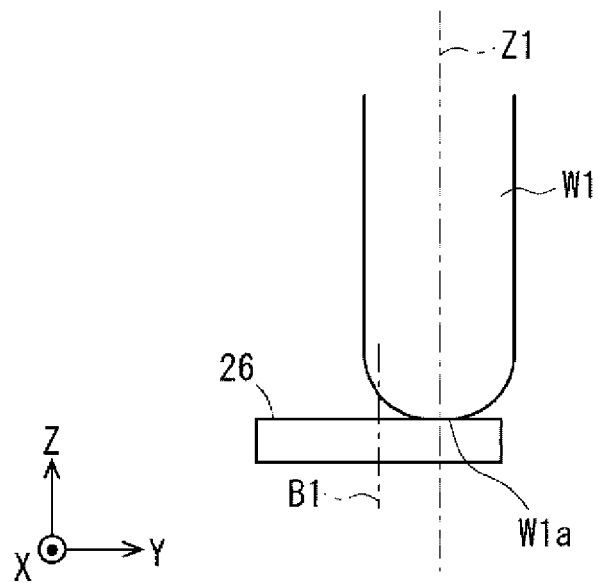
FIG. 11 is a view illustrating a positional relationship between a welding tip and a file.
Figure 12A:
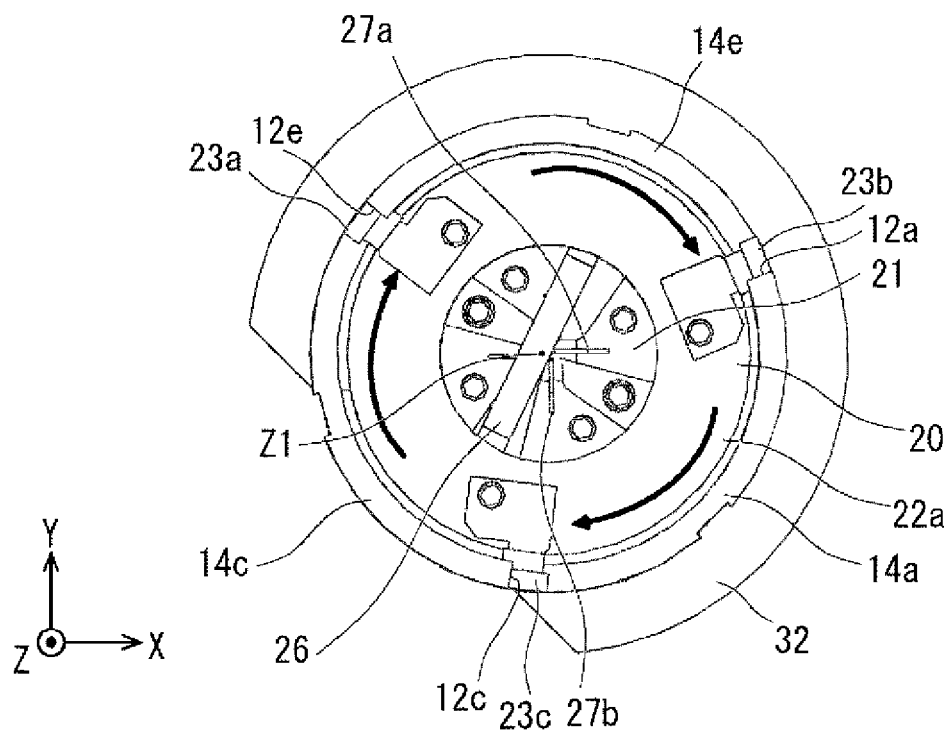
FIG. 12A is another top view illustrating the rotating operation of the polishing unit in the polishing device according to the first embodiment.
Figure 12B:
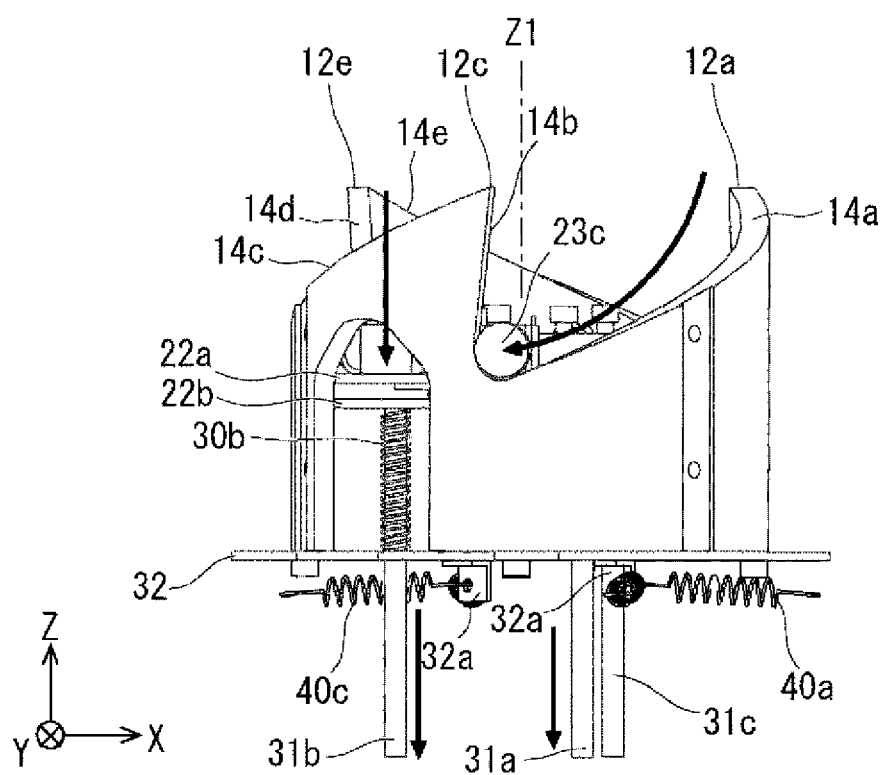
FIG. 12B is another side view illustrating the rotating operation of the polishing unit in the polishing device according to the first embodiment.
Figure 13:
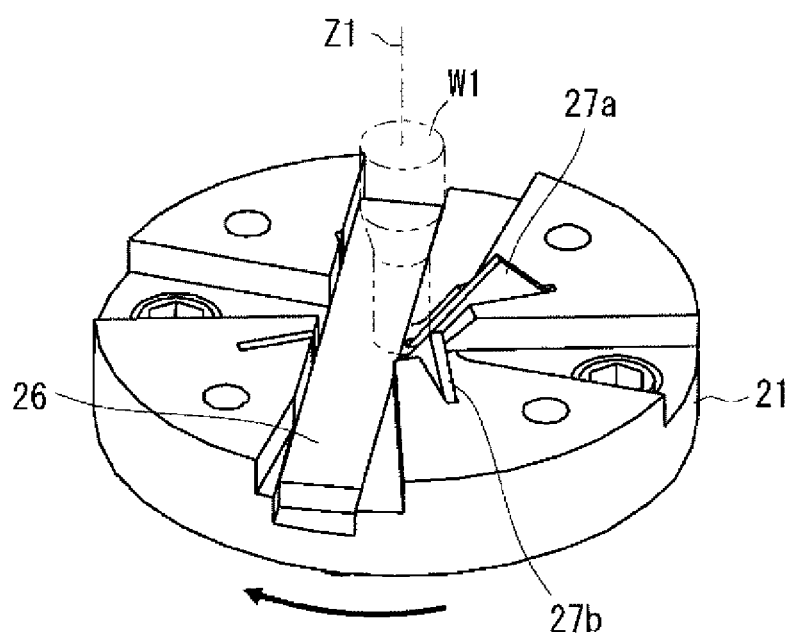
FIG. 13 is another perspective view illustrating the polishing operation of the polishing unit in the polishing device according to the first embodiment.
Figure 14:
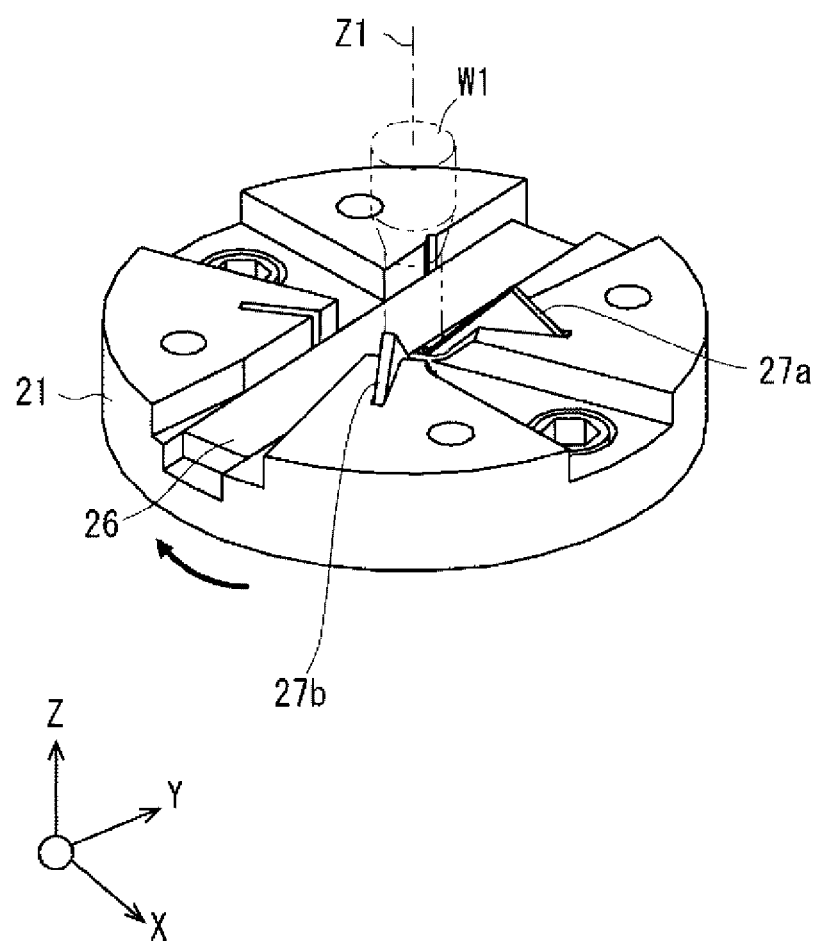
FIG. 14 is yet another perspective view illustrating the polishing operation of the polishing unit in the polishing device according to the first embodiment.
Figure 15A:
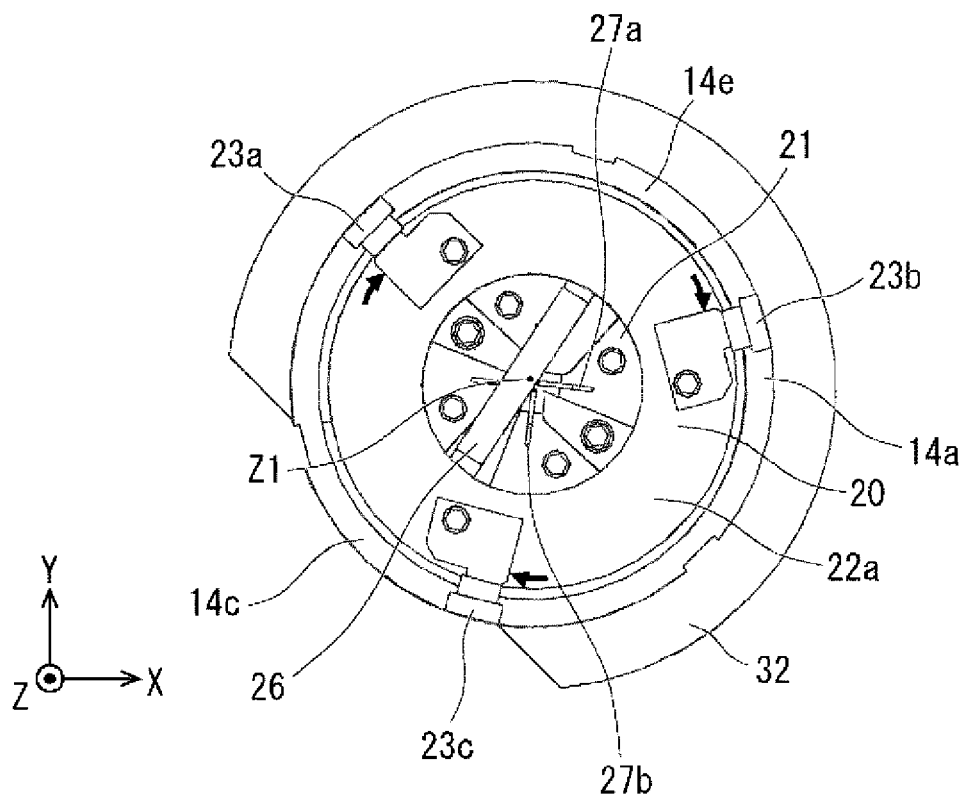
FIG. 15A is yet another top view illustrating the rotating operation of the polishing unit in the polishing device according to the first embodiment.
Figure 15B:
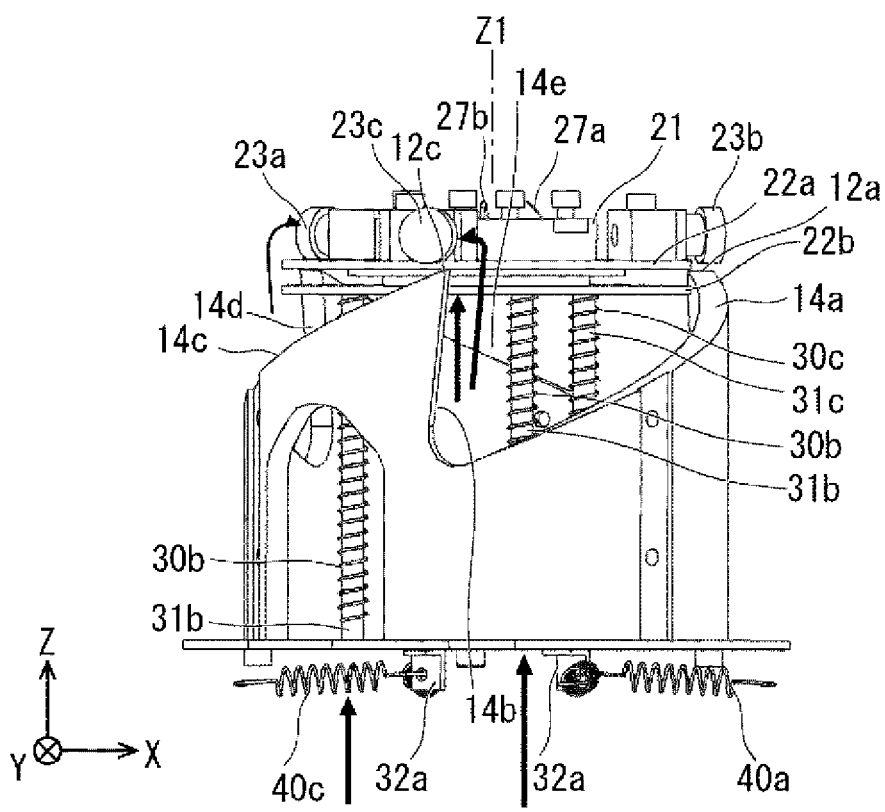
FIG. 15B is yet another side view illustrating the rotating operation of the polishing unit in the polishing device according to the first embodiment.
Figure 16:
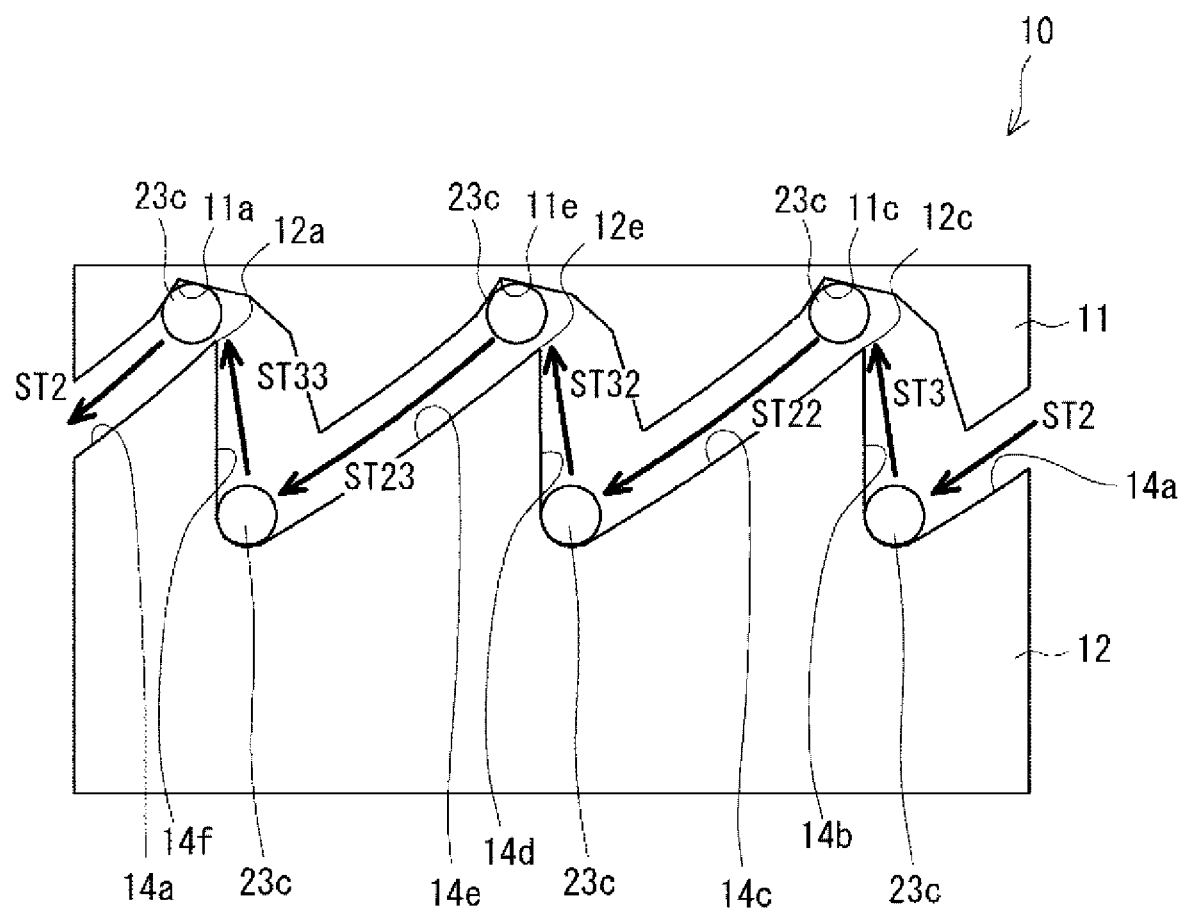
FIG. 16 is a schematic view illustrating a trajectory of a projected portion within a groove during the polishing operation of the polishing unit in the polishing device according to the first embodiment.

A description will be provided on a method of using the polishing device according to the first embodiment with reference to FIG. 7 to FIGS. 15A, 15B. FIG. 7 and FIG. 8 are views illustrating the method of using the polishing device according to the first embodiment. FIG. 9A is a top view illustrating rotating operation of the polishing unit in the polishing device according to the first embodiment. FIG. 9B is a side view illustrating the rotating operation of the polishing unit in the polishing device according to the first embodiment. FIG. 10 is a perspective view illustrating polishing operation of the polishing unit in the polishing device according to the first embodiment. FIG. 11 is a view illustrating a positional relationship between a welding tip W1 and the file 26. FIG. 12A is another top view illustrating the rotating operation of the polishing unit in the polishing device according to the first embodiment. FIG. 12B is another side view illustrating the rotating operation of the polishing unit in the polishing device according to the first embodiment. FIG. 13 and FIG. 14 are other perspective views illustrating the polishing operation of the polishing unit in the polishing device according to the first embodiment. In FIG. 10, FIG. 11, FIG. 13, and FIG. 14, components of the polishing unit 20 are appropriately omitted to facilitate understanding. FIG. 15A is yet another top view illustrating the rotating operation of the polishing unit in the polishing device according to the first embodiment. FIG. 15B is yet another side view illustrating the rotating operation of the polishing unit in the polishing device according to the first embodiment. Here, in FIGS. 9A, 9B, FIGS. 12A, 12B, and FIGS. 15A, 15B, the configurations of the upper cylindrical portion 11 and the like are omitted to facilitate understanding. FIG. 16 is a schematic view illustrating a trajectory of a projected portion 23c within the groove 14 in the polishing operation of the polishing unit in the polishing device according to the first embodiment.

As illustrated in FIG. 7, the polishing device 100 is installed adjacent to a welder M1, and is used. The welder M1 can hold the welding tip W1 with the use of a robot arm M2 and translate the welding tip W1 within a specified three-dimensional space. Note that the welder M1 does not require an actuator that causes rotary motion of the welding tip W1.

An oxide film or the like (not illustrated) is formed on a surface of a distal end of the welding tip W1. The oxide film or the like is formed when the welding tip W1 is used by the welder M1 in a welding process in advance. Because the welding tip W1 is also used in another welding process, the welding tip W1 is preferably polished to remove the oxide film or the like.

As illustrated in FIG. 8, the welding tip W1 is inserted in the through-hole 25a of the welding tip guide 25 (welding tip insertion step ST1). More specifically, the welding tip W1 is held with the use of the robot arm M2 of the welder M1, which is illustrated in FIG. 7. Furthermore, as illustrated in FIG. 8 to FIG. 10, the welding tip W1 is translated, inserted in the welding tip guide 25, and brought into contact with the file 26 and the chamfering blades 27a, 27b. Here, an axis of the welding tip W1 matches the center axis Z1 of the polishing unit 20. The polishing unit 20 hardly receives a force in a downward direction (here, a direction toward the negative side on the Z-axis) from the welding tip W1. The polishing unit 20 hardly rotates about the center axis Z1. In addition, the projected portion 23c of the polishing unit 20 is located on an upper end of the inclined groove portion 14a, the projected portion 23a is located on an upper end of the inclined groove portion 14c, and the projected portion 23b is located on an upper end of the inclined groove portion 14e.

It should be noted that, as illustrated in FIG. 11, the center axis Z1 of the body 21 may extend on one side of the center axis B1 of the file 26. In other words, the file 26 may be disposed such that the center axis Z1 is located at a specified second distance from the center axis B1. In such a case, it is confirmed from experience that a polishing amount of the welding tip W1 by the file 26 is larger than that in the case where the center axis Z1 crosses the center axis B1. As one of the reasons for the above, for example, it is considered that a moving amount per rotation of a portion W1a of the file 26, which makes friction contact with the welding tip W1, is large as compared to the case where the center axis Z1 crosses the center axis B1.

Next, as illustrated in FIGS. 12A and 12B, after the welding tip W1 is caused to contact the polishing unit 20, the welding tip W1 is pressed against the polishing unit 20 and is polished (polishing step ST2). More specifically, the robot arm M2 is used to press the welding tip W1 toward a deep side (i.e., a lower side) of the through-hole 25a and cause the welding tip W1 to contact the file 26 and the chamfering blades 27a, 27b. Then, as shown in FIG. 8, FIGS. 9A, 9B, and FIGS. 12A, 12B, the polishing unit 20 moves downward (here, toward the negative side on the Z-axis) from the welding tip W1. Thus, the springs 30a, 30b, 30c are compressed by the plate 22b and the plate 32. The polishing unit 20 moves toward the plate 32. In addition, at least a part of the end of each of the shaft bodies 31a, 31b, 31c on the plate 32 side passes through the plate 32.

Furthermore, as illustrated in FIGS. 12A, 12B and FIG. 16, the projected portion 23c of the polishing unit 20 moves from the upper end of the inclined groove portion 14a to a lower end of the inclined groove portion 14a. Similarly, the projected portion 23a moves from the upper end of the inclined groove portion 14c to a lower end of the inclined groove portion 14c. The projected portion 23b moves from the upper end of the inclined groove portion 14e to a lower end of the inclined groove portion 14e.

Here, there is a case where the highest point 11a is located closer to the inclined groove portion 14a than the crossing portion 12a is, the highest point 11c is located closer to the inclined groove portion 14c than the crossing portion 12c is, and the highest point 11e is located closer to the inclined groove portion 14e than the crossing portion 12e is. The above-described case is preferred because the projected portion 23a, the projected portion 23b, and the projected portion 23c can easily move to the inclined groove portion 14c, the inclined groove portion 14e, and the inclined groove portion 14a, respectively. That is, the above-described case is preferred because the projected portion 23a, the projected portion 23b, and the projected portion 23c are unlikely to return to the axial groove portion 14b, the axial groove portion 14d, and the axial groove portion 14f.

In this way, the polishing unit 20 rotates about the center axis Z1. When the number of the axial groove portions is set to N1, a rotation angle of the polishing unit 20 is 360°/N1. In the example illustrated in FIGS. 9A, 9B and FIGS. 12A, 12B, N1 is 3. Thus, the rotation angle of the polishing unit 20 is 120°.

As illustrated in FIG. 13 and FIG. 14, while the distal end of the welding tip W1 is kept in contact with the file 26 and the chamfering blades 27a, 27b, the file 26 and the chamfering blades 27a, 27b rotate about the center axis Z1. This causes the distal end of the welding tip W1 to be polished by the file 26. In addition, an outer peripheral surface in the vicinity of the distal end of the welding tip W1 is chamfered by the chamfering blades 27a, 27b. In this way, the oxide film or the like can be removed from the surface of the welding tip W1, and the welding tip W1 can be polished.

In one specific example illustrated in FIG. 13 and FIG. 14, when seen from above (here, the positive side on the Z-axis), the distal end of the welding tip W1 is held between the file 26 and the chamfering blades 27a, 27b. Accordingly, the welding tip W1 can be stably polished and thus can be finished appropriately.

Next, the welding tip W1 is pulled upward, and the polishing unit 20 is moved to a specified position (polishing preparation step ST3). More specifically, the robot arm M2 is used to move the welding tip W1 toward an upper side of the through-hole 25a. As a result, as illustrated in FIGS. 15A, 15B, a load that is applied to the springs 30a, 30b, 30c by pressing the welding tip W1 is released. Thus, the springs 30a, 30b, 30c extend to press the plate 22b upward. The polishing unit 20 moves away from the plate 32 and moves toward the welding tip W1 (here, toward the positive side on Z-axis). In addition, at least a part of each of the shaft bodies 31a, 31b, 31c on the plate 32 side moves toward the holder 10 and returns to the original position.

Furthermore, as illustrated in FIG. 16, the projected portion 23c of the polishing unit 20 moves from the lower end of the inclined groove portion 14a, passes through the axial groove portion 14b, and moves to the upper end of the inclined groove portion 14c. Similarly, the projected portion 23a moves from the lower end of the inclined groove portion 14c, passes through the axial groove portion 14d, and moves to the upper end of the inclined groove portion 14e. The projected portion 23b moves from the lower end of the inclined groove portion 14e, passes through the axial groove portion 14f, and moves to the upper end of the inclined groove portion 14a. The polishing unit 20 reaches a specified position.

Next, when a polishing step ST22, which is the same as the polishing step ST2 described above, and a polishing preparation step ST32, which is the same as the polishing preparation step ST3, are performed, the polishing unit 20 rotates about the center axis Z1 and polishes the welding tip W1 in a similar manner. Here, as illustrated in FIG. 16, the projected portion 23c of the polishing unit 20 moves from the upper end of the inclined groove portion 14c to the lower end of the inclined groove portion 14c. Furthermore, the projected portion 23c moves from the lower end of the inclined groove portion 14c, passes through the axial groove portion 14d, and moves to the upper end of the inclined groove portion 14e.

Next, when a polishing step ST23, which is the same as the polishing step ST2 described above, and a polishing preparation step ST33, which is the same as the polishing preparation step ST3, are performed, the polishing unit 20 rotates about the center axis Z1 and polishes the welding tip W1 in a similar manner. Here, as illustrated in FIG. 16, the projected portion 23c of the polishing unit 20 moves from the upper end of the inclined groove portion 14e to the lower end of the inclined groove portion 14e. Furthermore, the projected portion 23c moves from the lower end of the inclined groove portion 14e, passes through the axial groove portion 14f, and moves to the upper end of the inclined groove portion 14a.

In this way, the polishing unit 20 rotates about the center axis Z1 by 360° in total to polish the welding tip W1. Thus, the entire outer peripheral surface in the vicinity of the distal end of the welding tip W1 can be reliably polished. In this way, the welding tip W1 can be further used in another welding process.

As it has been described so far, with the configuration of the polishing device 100 for the welding tip, when the welding tip W1 is translated and pressed against the chamfering blades 27a, 27b, the projected portions 23a, 23b, 23c of the polishing unit 20 move along the groove 14, and the polishing unit 20 rotates. Due to the rotation of the polishing unit 20, the chamfering blades 27a, 27b rotate while the chamfering blades 27a, 27b are in contact with the welding tip W1. Thus, the welding tip W1 is polished. Accordingly, the welding tip W1 can be polished without a need for the actuator that rotates the welding tip W1 or the chamfering blades 27a, 27b. Thus, facility cost can be reduced. In addition, even in the case where the worker's hands are used, a process of directly rotating the welding tip W1 or the chamfering blades 27a, 27b is not required, and thus an increase in man-hours can be restrained. As a result, the welding tip W1 can be continuously and easily polished. Therefore, it is possible to simplify polishing work on the welding tip (i.e., it is possible to easily perform the polishing work on the welding tip), and to reduce cost with the simple configuration.

The specified second distance is provided between the center axis B1 of the file 26 and the center axis Z1 of the polishing unit 20. Accordingly, when the file 26 rotates due to the rotation of the polishing unit 20, the welding tip W1 can be polished while a contact surface of the file 26, which makes contact with the welding tip W1, varies. In this way, wear of the file 26 can be reduced.

When the welding tip W1 contacts the polishing unit 20, the welding tip W1 is held between the chamfering blades 27a, 27b and the file 26. Thus, since the welding tip W1 is held between the chamfering blades 27a, 27b and the file 26, the position of the welding tip W1 is stabilized. As a result, the welding tip W1 can be stably finished with good accuracy.

It should be noted that the disclosure is not limited to the above embodiment and can be appropriately modified within the scope of the disclosure. For example, although the polishing device 100 is configured such that the polishing unit 20 rotates in a clockwise direction on the X-Y plane in the embodiment, the polishing device 100 may be configured such that the polishing unit 20 rotates in a counterclockwise direction. In addition, although the polishing device 100 includes the chamfering blades 27a, 27b, the polishing device 100 may include a blade other than the chamfering blades 27a, 27b. In the case where the number of the blades is changed, the rotation angle of the polishing unit 20 may be changed in accordance with the number of the blades as long as the polishing unit 20 rotates by 360° or greater in total in accordance with the number of the blades.

Furthermore, the rotation angle of the polishing unit 20 does not need to reach 360° in a single rotating operation. The rotation angle of the polishing unit 20 may reach 360° in total after performing polishing a plurality of times. In this case, the number of the axial groove portions may be larger than the number of the projected portions. One specific example of the "single rotating operation" described above corresponds to the polishing step ST2, ST22, or ST23. One specific example of "performing polishing a plurality of times" corresponds to performing the polishing step ST2, ST22, or ST23 and the polishing preparation step ST3, ST32, or ST33 or a combination of the steps a plurality of times.

The welder M1 is used to insert the welding tip W1 in the inside of the welding tip guide 25. However, the worker's hands may be used to translate the welding tip W1 and insert the welding tip W1 in the inside of the welding tip guide 25. In such a case, the process of causing rotary motion of the welding tip W1 with the use of the worker's hands is not required. Thus, the increase in man-hours can be restrained, and the welding tip W1 can be easily polished.

Although the polishing step ST22, which is the same as the polishing step ST2 described above, and the polishing preparation step ST32, which is the same as the polishing preparation step ST3, are performed, the numbers of times these steps are performed may be appropriately changed.

Instead of the base 50, the polishing device 100 may further include another holder 10, another polishing unit 20, and another polishing unit pressing unit 30. The other holder 10, the other polishing unit 20, and the other polishing unit pressing unit 30 may be provided below the polishing unit pressing unit 30 such that the through-hole 25a of the welding tip guide 25 is opened downward (toward the negative side on the Z-axis). An insulating member that electrically insulates the polishing unit pressing units 30 from each other may be provided therebetween. There is a welding robot configured to hold welding tips W1 that mutually faces each other. The welding tips W1 that mutually face each other may be polished simultaneously with the use of the welding robot.

What is claimed is:

1. A polishing device for a welding tip, comprising:
    a holder having a cylindrical shape; and
    a polishing unit that is held in an inside of the holder so as to be rotatable about an axis of the holder, wherein
    the polishing unit includes a blade configured to polish a welding tip,
    the blade polishes the welding tip due to rotation of the polishing unit,
    the holder includes an upper portion and a lower portion that are spaced apart to form a groove therebetween that extends along an entire inner circumference of the holder,
    the groove includes axial groove portions each of which extends along the axis of the holder, and inclined groove portions each of which extends for a specified first distance and is inclined in one direction with respect to the axial groove portions,
    the axial groove portions and the inclined groove portions are alternately arranged, and
    the polishing unit includes projected portions each of which extends to an inside of the groove, and the number of the projected portions is two or more and is equal to or less than the number of the axial groove portions.

2. The polishing device according to claim 1, wherein:
    the polishing unit includes a file;
    a specified second distance is provided between a center of the file and a center axis of the polishing unit; and
    when the welding tip contacts the polishing unit, the blade and the file contact a distal end of the welding tip.

3. The polishing device according to claim 2, wherein when the welding tip contacts the polishing unit, the welding tip is held between the blade and the file.

* * * * *